(12) United States Patent
Glebov et al.

(10) Patent No.: US 7,529,442 B2
(45) Date of Patent: May 5, 2009

(54) POLARIZATION-INDEPENDENT ELECTRO-OPTICAL (EO) SWITCHING

(75) Inventors: Alexei L. Glebov, San Mateo, CA (US); Takeo Hamada, Cupertino, CA (US)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/469,149

(22) Filed: Aug. 31, 2006

(65) Prior Publication Data
US 2008/0056638 A1 Mar. 6, 2008

(51) Int. Cl.
G02B 6/26 (2006.01)
G02B 6/42 (2006.01)

(52) U.S. Cl. .............. 385/17; 385/15; 385/16; 385/31; 385/37; 385/39; 385/47; 385/49

(58) Field of Classification Search .............. 385/17
See application file for complete search history.

(56) References Cited

U.S. PATENT DOCUMENTS

| | | | | |
|---|---|---|---|---|
| 3,804,489 A * | 4/1974 | Li et al. ............... | 359/320 |
| 5,970,186 A | 10/1999 | Kenney et al. | |
| 6,084,992 A | 7/2000 | Weber et al. | |
| 6,385,362 B1 | 5/2002 | Norwood | |
| 6,768,828 B2 | 7/2004 | Gill et al. | |
| 7,095,938 B2 * | 8/2006 | Tolstikhin ............ | 385/131 |
| 2002/0154866 A1 * | 10/2002 | Tombling et al. ....... | 385/52 |
| 2002/0181067 A1 | 12/2002 | Romanovsky et al. | |
| 2003/0103714 A1 | 6/2003 | Abeles et al. | |
| 2004/0062475 A1 | 4/2004 | Popovich et al. | |
| 2004/0247239 A1 | 12/2004 | Eldada | |

OTHER PUBLICATIONS

Eldada et al., "Advances in Polymer Integrated Optics," IEEE Journal of Selected Topics in Quantum Electronics, vol. 6, No. 1, pp. 54-68, Jan.-Feb. 2000.
Eldada et al., "Advances in Polymeric Integrated Optical Componentry,", Integrated Photonics Research, 4 pages, 2001.
Eldada et al., "Polymeric Components for All-Optical Networks," Proc. SPIE, 7 pages, 2000.
Eldada, "Polymer Integrated Optics: Promise vs. Practicality," Dupont Photonics Technologies, 12 pages, unknown.
Gerhardt et al., "Hybrid Integrated Metro Ring Node Subsystem on a Chip," Photonics West, Proc. SPIE, pp. 13-20, 2003.
Giles et al., "The Wavelength Add/Drop Multiplexer for Lightwave Communication Networks," Bell Labs Technical Journal, pp. 207-229, Jan.-Mar. 1999.

(Continued)

*Primary Examiner*—Frank G Font
*Assistant Examiner*—Mary A El Shammaa
(74) *Attorney, Agent, or Firm*—Baker Botts L.L.P.

(57) ABSTRACT

In one embodiment, an apparatus includes a passive element including one or more first waveguides and one or more second waveguides. The apparatus also includes an active element integrated into the passive element. The active element includes one or more third waveguides that actively guide light from the first waveguides to the second waveguides. The third waveguides include polarization-independent electro-optical (EO) thin film.

26 Claims, 3 Drawing Sheets

OTHER PUBLICATIONS

Kimerling, L., "Microphotonic Integrated Circuits," Abstract from Symposium O—Microphotonics III, 2 pages, Dec. 1-5, 2002.

Koerkamp et al., "Design and Fabrication of a Pigtailed Thermo-Optic 1×Switch," Integrated Photonics Research, 1994 Technical Digest, Series vol. 3, 5 pages, Feb. 17-19, 1994.

Keil et al., "Integrated Optical Switching Devices for Telecommunications Made on Plastics," Proc. Plastics in Telecom, 7 pages, 1998.

Lagali et al., "Ultra-Low Power and High Dynamic Range Variable Optical Attenuator Array," Proc. ECOC, pp. 430-431, 2001.

* cited by examiner

...

POLARIZATION-INDEPENDENT ELECTRO-OPTICAL (EO) SWITCHING

TECHNICAL FIELD

This disclosure relates generally to optical communications.

BACKGROUND OF THE INVENTION

Optical add-drop multiplexers (OADMs) are important components of optical networks. An OADM typically includes optical switches that selects output ports for wavelength paths to cause certain wavelength paths to pass through the OADM and other wavelength paths to drop from the OADM. As transmission rates in optical networks increase, faster OADMs will become more important. The suitability of an OADM for a transmission mode (such as, for example, circuits, bursts, or packets) often depends on the switching speed of the OADM. Among optical switching technologies available today, electro-optical switch is known to be one of the fastest, possibly attaining the switching speed on the order of several nanoseconds.

BRIEF DESCRIPTION OF THE DRAWINGS

To provide a more complete understanding of the present invention and features and advantages thereof, reference is made to the following description, taken in conjunction with the accompanying drawings, in which.

DESCRIPTION OF EXAMPLE EMBODIMENTS

Figure 1:
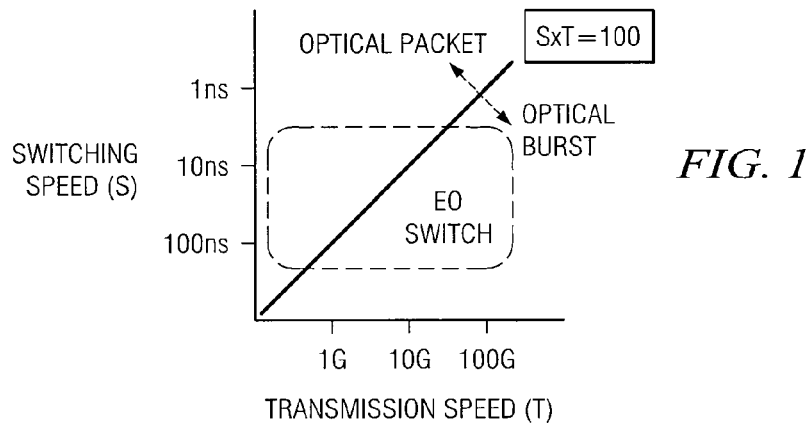
FIG. 1 illustrates an example relationship between switching speed and transmission speed of a wavelength channel in optical packet/burst transmission systems.

FIG. 1 illustrates an example relationship between switching speed (S) and transmission speed of a wavelength channel (T) in optical packet/burst transmission systems. On the Internet, a typical packet is between 100 bytes (or 800 bits) and 300 bytes (or 2400 bits) long. To be practical, optical communication of a packet typically requires switching speeds fast enough to render loss time attributable to switching delay short relative to the transmission time of the packet. As an example and not by way of limitation, switching delay equal to 10% or less of the transmission time of the packet may be acceptable. Because of the average size of a packet on the Internet, such delay may correspond to approximately 100 bits.

In FIG. 1, along the line S×T=100, the product of switching time (S) and transmission speed (T) is 100. Above the line, optical packet transmission (OPT) is feasible. Switching technologies below the line are better suited to optical burst transmission (OBT). OPT is unable to aggregate packets into bursts, but able to employ a labeling mechanism to facilitate routing in the optical domain. In contrast, to assemble a larger transmission data unit from a collection of smaller packets, OBT aggregates and disaggregates packets to and from bursts.

As FIG. 1 illustrates, to be feasible at higher transmission speeds, OPT requires faster switching speeds. In contrast, OBT does not require faster switching speeds to be feasible at higher transmission speeds. As an example and not by way of limitation, a communication system that lacks faster switching speeds may have to use OBT to provide higher transmission speeds, whereas a communication system having faster switching speeds may use OPT to provide higher transmission speeds. As advances in optical technologies increase transmission speeds, limitations on switching speeds imposed by the law of physics will likely require many communication systems to use OBT.

EO switches typically include optical directional couplers or Mach-Zehnder interferometer (MZI)-type modulators made of lithium niobate (LN). LN couplers and modulators often achieve switching speeds of approximately 1 ns. However, LN switches exhibit significant polarization dependence, which impedes the integration of LN switches into OADMs. LN switches communicate only polarized light and, therefore, require complex systems that include polarization splitters, combiners, and other optical devices to accommodate the polarization dependence of LN.

Advances in EO thin-film fabrication have enabled various approaches to the integration of EO switches into OADM networks. For example, advances in EO thin-film fabrication have demonstrated that lead zirconium titanate (PLZT) thin film having a material propagation loss of less than 1 dB/cm and an effective EO coefficient that is nearly the same for the transverse electric TE polarization and the transverse magnetic (TM) polarization of the light can be grown on strontium titanium oxide (STO) substrates. Wet etching or reactive ion etching (RIE) can form channel or ridge waveguides made of PLZT thin film.

Figure 2:
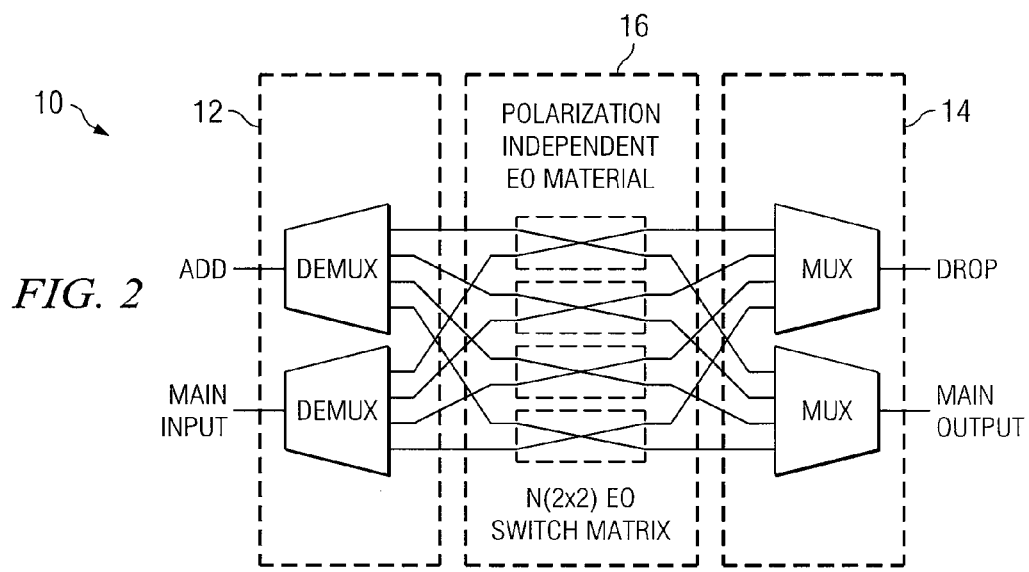
FIG. 2 illustrates an example OADM device.

Because PLZT lacks significant polarization dependence, the example architecture illustrated in FIG. 2 can incorporate PLZT into an OADM device. FIG. 2 is a simple schematic of the OADM device, which has only four channels, but is extendable to a large number of ports and channels. As an example and not by way of limitation, the OADM device may be extendable for use in a dense wavelength division multiplexing (DWDM) network deploying forty wavelength channels ($\lambda_{1-40}$).

FIG. 2 illustrates an example OADM device 10 that has four ports: main input; main output; add; and drop. OADM device 10 includes three blocks 12, 14, and 16. Demultiplexers (DEMUXs) in block 12 separate input signals having different wavelengths arriving at the main input port and the add port. The DEMUXs could be planar arrayed waveguide gratings (AWG). Multiplexers (MUXs) in element 14 combine output signals of different wavelengths leaving at main output port and the drop port. The MUXs could also be planar AWGs. Block 16 includes an EO switch array that provides active add/drop functionality. The switches in the EO switch array are 2×2 switches. Although block 16 is illustrated and described as having a particular EO switch array, block 16 could have any suitable EO switch array. For example, the EO switch array could be more complex and include higher-order switches. Blocks 12, 14, and 16 are fabricated separately, and OADM device 10 is assembled from blocks 12, 14, and 16 using active alignment, which is labor intensive and costly.

Figure 3:
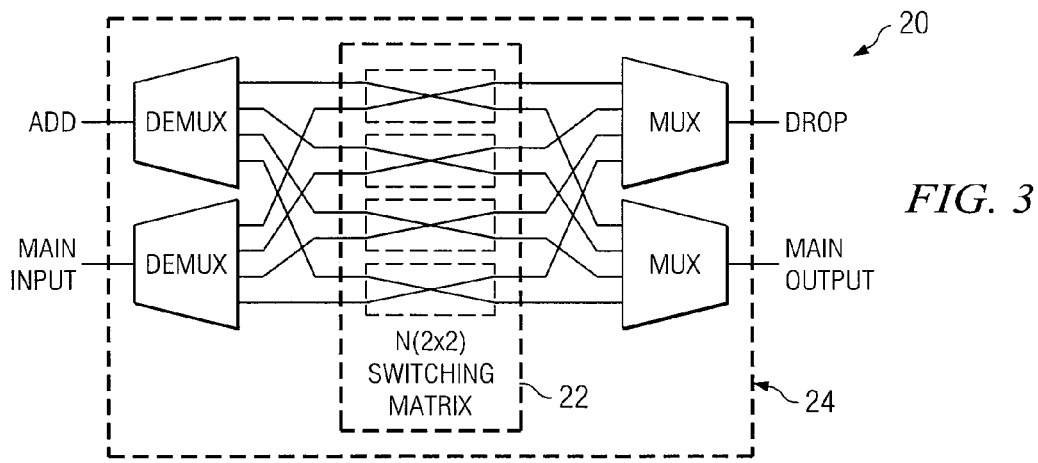
FIG. 3 illustrates another example OADM device.

FIG. 3 illustrates another OADM device 20. The architecture of OADM device 20 differs from the architecture of OADM device 10. The ports and channels of OADM device 20 are the same as the ports and channels of OADM device 10, but N (2×2) switching matrix 22 of OADM device 20 is hybrid integrated into optical waveguide substrate 24 of OADM device 20. The MUX and DEMUX devices (which could be planar AWGs) are fabricated on one substrate, possibly according to one or more well known planar lightwave circuit (PLC) technologies. For example, silica-on-silicon PLC technology is a candidate for fabrication of the planar AWGs.

However, silica-on-silicon PLC technology tends to have drawbacks. One such possible drawback is the mode mismatch of light in silica waveguides and in PLZT waveguides. PLZT waveguides typically have mode dimensions of about 2-6 µm, sometimes as small as 500 nm. For switching, since applied voltage is often proportional to EO film thickness, smaller waveguides might be somewhat preferential to larger waveguides. Thus, reducing the size of a waveguide typically enables reducing the switch-driving voltage. The lower the driving voltage, the higher the possible switching speeds.

On the other hand, typical dimensions of optical modes in single-mode silica waveguides are approximately 5-10 µm. Therefore, mode coupling between silica waveguides and EO waveguides is a potential issue. In particular embodiments, fabrication of optical waveguide substrate 24 includes silicon waveguides. Particular embodiments use standard fabrication techniques to fabricate one or more portions of optical waveguide substrate 24. In particular embodiments, waveguide substrate 24 is a silicon-on-insulator (SOI) substrate in which the top silicon layer (which may have a thickness of up to several microns) is formed on a layer of silica separating Si waveguides from the Si substrate. Si waveguides typically have a strong refractive-index contrast that allows strong optical-mode confinement in waveguide cores. The strong confinement often results in small core dimensions, possibly on the scale of approximately 0.1 to 1 micron, and relatively small waveguide bending radii.

Figure 4A:
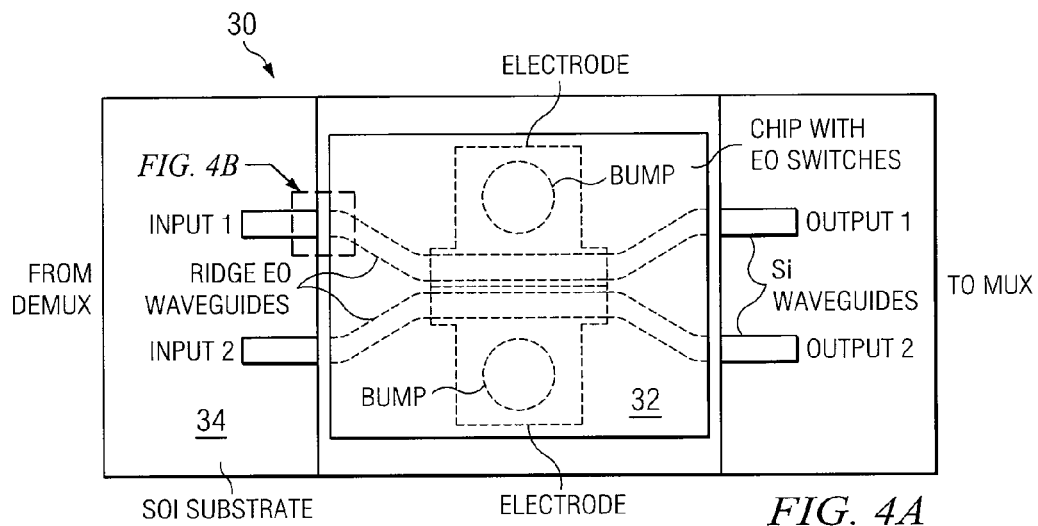
FIG. 4A illustrates a top-down view of an example EO OADM device.

FIGS. 4A-4B and 5A-5B illustrate an example physical structure of an example EO OADM device 30. FIG. 4A illustrates a top-down view of EO OADM device 30. EO OADM device 30 is a single unit and includes two input waveguides, two output waveguides, and a 2×2 directional coupler. The present invention contemplates an OADM device having any suitable number of channels (such as, for example, 100 or more) and an OADM system having any suitable number of such devices, which may, but need not all have the same number of channels. In particular embodiments, 8-40 channels is the most useful count. EO OADM device 30 includes EO chip 32, assembled on top of waveguide substrate 34. In particular embodiments, waveguide substrate 34 is a SOI substrate. In particular embodiments, the waveguides on substrate 24 (in FIG. 3) or substrate 34 (in FIG. 4A) can be formed from optical polymers with low absorption at the device operation wavelength. The refractive index difference between the polymer waveguide core and cladding layers can be as high as 10% and, therefore, the waveguide core dimensions can be as small as 1-3 µm for the single mode propagation of light in the waveguide. Using polymer waveguides instead of Si waveguide can also enable another inexpensive fabrication technology of hybrid integrated EO switched with low polarization dependence.

Figure 4B:
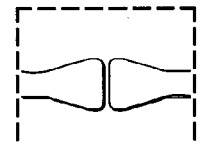
FIG. 4B illustrates example lateral tapering of waveguides at a junction between two waveguides in the EO OADM device illustrated in FIG. 4A.
Figure 5A:
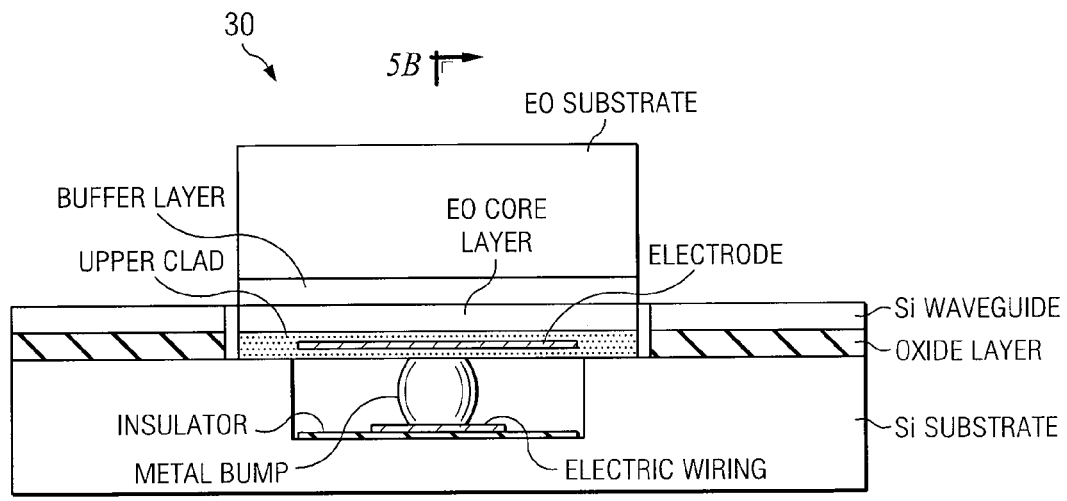
FIG. 5A illustrates a side view of the EO OADM device illustrated in FIG. 4A.
Figure 5B:
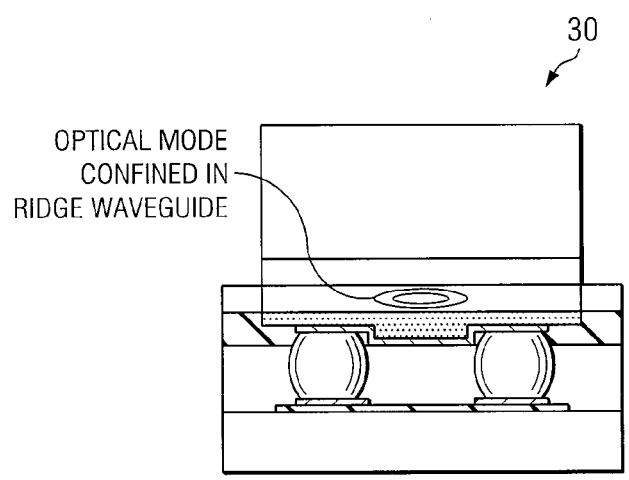
FIG. 5B illustrates a cross-section view of the EO OADM device illustrated in FIG. 4A.

EO chip 32 is an active component of EO OADM device 30. From one or more DEMUXs, light signals pass to EO chip 32 through input 1 and input 2 (which, in particular embodiments, are Si, silica, polymer, photonic crystal, or other waveguides) on the left of FIG. 4A. After the light signals pass through EO chip 32, the light signals pass to output 1 and input 2 (which, in particular embodiments, are Si, silica, polymer, photonic crystal, or other waveguides) which communicate the light signals to one or more MUXs. The switch in EO OADM device 30 includes one 2×2 directional coupler. The present invention also contemplates higher-order switches, such as, for example, 8×8, etc. The present invention also contemplates other active devices, such as, for example, MZIs and digital optical switches (DOS) with Y-branch splitters. FIG. 4B illustrates example lateral tapering of waveguides at a junction between two waveguides in EO OADM device 30. FIG. 5A illustrates a side view of EO OADM device 30. Light signals pass through EO OADM device 30 from left to right in FIG. 5A. FIG. 5B illustrates a cross-section view of EO OADM device 30 at 90° from the side view illustrated in FIG. 5A. Waveguide substrate 34 includes three layers: a Si support; an oxide layer; and a Si waveguide layer. Waveguide substrate 34 includes a recess that has two openings. The first opening is narrower and goes down approximately 1-10 µm into the Si support. The second opening is wider and goes down only to the top level of the Si support so that the component of EO OADM device 30 resting on the ledge created by the second opening is substantially level with the oxide layer of waveguide substrate 34. The first opening houses electrical wiring, which in particular embodiments includes one or more insulating layers, one or more fan-out lines, and one or more solder bumps or bonding posts. The electrical wiring facilitates communication of electrical signals to EO chip 32 to control operation of EO chip 32.

Figure 6A:
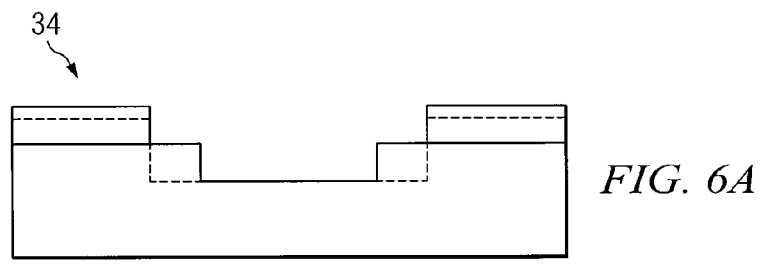
FIG. 6A illustrates a side view of an example shape of a recess in a waveguide substrate of the EO OADM device illustrated in FIG. 4A.
Figure 6B:
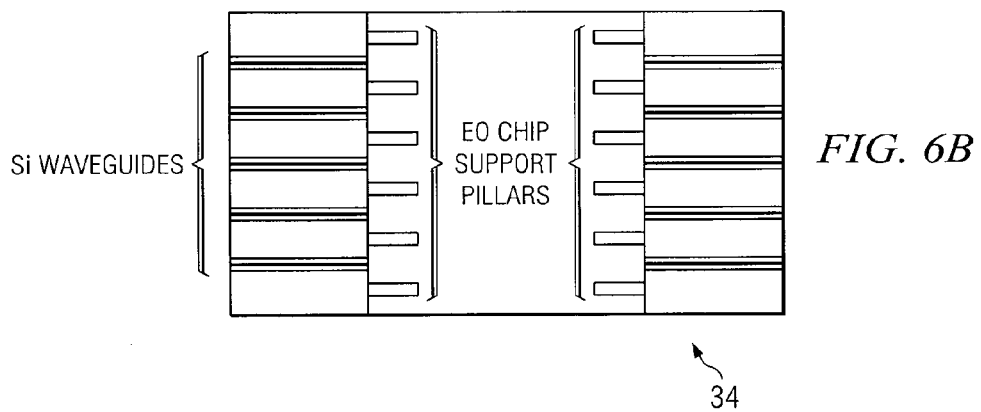
FIG. 6B illustrates a top-down view of an example shape of a recess in a waveguide substrate of the EO OADM device illustrated in FIG. 4A.

EO chip 32 includes three layers: a buffer layer; a core layer, and a ridge layer (or upper clad). The optical mode resides in the core layer, as illustrated in FIG. 5B. One reason for housing the optical mode in the core layer is the effective refractive index difference in the core layer. EO chip 32 includes a ridge waveguide. The present invention also contemplates other types of waveguides (such as, for example, channel waveguides having core layers formed by etching the core side walls) in EO chip 32. A transparent electrode lies in or on top of the ridge layer. In particular embodiments, the transparent electrode includes an indium tin oxide (ITO) thin film. In particular embodiments, EO chip 32 is flip-chip bonded to the top of the narrower opening of the recess etched into waveguide substrate 34. The core of the EO film in EO chip 32 is substantially level with the core of the Si waveguides in waveguide substrate 34 for good optical coupling. EO chip 32 substantially aligns itself, since EO chip 32 rests in the wider opening of the recess etched into the waveguide substrate 34. In particular embodiments, the lateral tapering illustrated in FIG. 4B facilitates alignment of the EO waveguides with the Si waveguides FIGS. 6A and 6B illustrate an example shape of the recess in waveguide substrate 34. FIG. 6A illustrates a side view of the recess, and FIG. 6B illustrates a top-down view of the recess. Light signals pass through waveguide substrate 34 from left to right in FIGS. 6A and 6B. The Si support in the wider opening of the recess is noncontinuous and includes pillars. EO chip 32 would rest on the tops of the pillars. The use of the pillars reduces the possibility of vertical misalignment caused by small particles caught between EO chip 32 and the Si support. To facilitate coupling the Si waveguides to I/O fibers, particular embodiments use reverse tapering of the Si cores of the Si waveguides, which reduces the cores as they approach I/O fibers. Reducing the core size "expels" the optical mode out of the Si core, which increases the optical mode size and improves the waveguide-fiber coupling efficiency.

In particular embodiments, the use polarization-independent thin-film materials for switching and dense Si waveguiding passive components enables fabrication of fast, compact, and cost-effective OADM modules. In particular embodiments, an integrated OADM device achieves switching speeds of less than approximately 5 ns. In particular embodiments, an EO chip 32 electrically and optically couples to a SOI substrate including optical MUX and DEMUX devices, as well as electric wiring and, possibly, drivers. Particular embodiments do not require any polarization handling. Hybrid integration is more cost effective than assembly of separate parts. Particular embodiments increase integration density of OADM devices and reduce costs associated with the same.

Particular embodiments have been used to describe the present invention, and a person having skill in the art may comprehend one or more changes, substitutions, variations, alterations, or modifications within the scope of the appended claims. The present invention encompasses all such changes, substitutions, variations, alterations, and modifications.

What is claimed is:

1. An apparatus comprising:
a passive element comprising two or more first waveguides and two or more second waveguides; and
an active element integrated into the passive element, the active element comprising a switching matrix and comprising two or more third waveguides operable to actively guide light from the first waveguides to the second waveguides, the third waveguides comprising polarization-independent electro-optical (EO) thin film, light entering the active element through the first waveguides and exiting the active element through the second waveguides.

2. The apparatus of claim 1, wherein the apparatus is an optical add-drop multiplexer (OADM).

3. The apparatus of claim 1, wherein the passive element further comprises one or more demultiplexers and one or more multiplexers, the first waveguides operable to guide light from the demultiplexers to the third waveguides, the second waveguides operable to guide light from the third waveguides to the multiplexers.

4. The apparatus of claim 3, wherein the multiplexers are wavelength division multiplexers (WDMs).

5. The apparatus of claim 3, wherein one or more of the demultiplexers or the multiplexers each comprise one or more planar arrayed waveguide gratings (AWGs).

6. The apparatus of claim 1, wherein a single wafer comprises the passive element.

7. The apparatus of claim 1, wherein the passive element is a planar lightwave circuit (PLC).

8. The apparatus of claim 1, wherein the first waveguides and the second waveguides comprise silicon.

9. The apparatus of claim 1, wherein the first waveguides and the second waveguides comprise one or more optical polymers.

10. The apparatus of claim 1, wherein the active element is a 2×2 switching matrix or an 8×8 switching matrix.

11. The apparatus of claim 1, wherein the passive element further comprises a silicon-on-insulator (SOI) substrate.

12. The apparatus of claim 1, wherein the passive element is a product of a first fabrication process and the active element is a product of a second fabrication process, the first fabrication process and the second fabrication process being separate from each other.

13. The apparatus of claim 1, wherein the passive element further comprises a plurality of support pillars operable to support the active element, each support pillar being laterally separated from one or more adjacent support pillars by one or more recesses, the support pillars facilitating proper alignment between the passive element and the active element.

14. A method comprising:
using a first device to communicate one or more optical signals between one or more second devices and one or more third devices, the first device comprising:
a passive element comprising two or more first waveguides and two or more second waveguides; and
an active element integrated into the passive element, the active element comprising a switching matrix and comprising two or more third waveguides operable to actively guide light from the first waveguides to the second waveguides, the third waveguides comprising polarization-independent electro-optical (EO) thin film. light entering the active element through the first waveguides and exiting the active element through the second waveguides.

15. The method of claim 14, wherein the first device is an optical add-drop multiplexer (OADM).

16. The method of claim 14, wherein the passive element further comprises one or more demultiplexers and one or more multiplexers, the first waveguides operable to guide light from the demultiplexers to the third waveguides, the second waveguides operable to guide light from the third waveguides to the multiplexers.

17. The method of claim 16, wherein the multiplexers are wavelength division multiplexers (WDMs).

18. The method of claim 16, wherein one or more of the demultiplexers or the multiplexers each comprise one or more planar arrayed waveguide gratings (AWGs).

19. The method of claim 14, wherein a single wafer comprises the passive element.

20. The method of claim 14, wherein the passive element is a planar lightwave circuit (PLC).

21. The method of claim 14, wherein the first waveguides and the second waveguides comprise silicon.

22. The apparatus of claim 14, wherein the first waveguides and the second waveguides comprise one or more optical polymers.

23. The method of claim 14, wherein the active element is a 2×2 switching matrix or an 8×8 switching matrix.

24. The method of claim 14, wherein the passive element further comprises a silicon-on-insulator (SOI) substrate.

25. The method of claim 14, wherein the passive element is a product of a first fabrication process and the active element is a product of a second fabrication process, the first fabrication process and the second fabrication process being separate from each other.

26. The method of claim 14, wherein the passive element further comprises a plurality of support pillars operable to support the active element, each support pillar being laterally separated from one or more adjacent support pillars by one or more recesses, the support pillars facilitating proper alignment between the passive element and the active element.

* * * * *